US006816364B2

United States Patent
Helot et al.

(10) Patent No.: US 6,816,364 B2
(45) Date of Patent: Nov. 9, 2004

(54) DISPLAY UNITS

(75) Inventors: Jacques H Helot, Grenoble (FR); Olivier Mache, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/318,276

(22) Filed: Dec. 11, 2002

(65) Prior Publication Data

US 2004/0047115 A1 Mar. 11, 2004

(30) Foreign Application Priority Data

Sep. 5, 2002 (EP) .............................................. 02354136

(51) Int. Cl.[7] .................................................. H05K 7/00
(52) U.S. Cl. ...................... 361/681; 248/919; 248/920
(58) Field of Search ................................ 361/681, 682, 361/683, 686, 724, 725; 312/223.1, 223.2, 223.3; 248/917, 919, 920, 922, 923

(56) References Cited

U.S. PATENT DOCUMENTS

| | | | | |
|---|---|---|---|---|
| 3,936,026 A | * | 2/1976 | Hampel et al. | .......... 248/349.1 |
| 5,978,211 A | | 11/1999 | Hong | .......... 361/683 |
| 6,189,842 B1 | * | 2/2001 | Bergeron Gull et al. | . 248/125.1 |
| 6,189,850 B1 | * | 2/2001 | Liao et al. | .......... 248/292.14 |
| 6,208,505 B1 | * | 3/2001 | Kuchta et al. | .............. 361/683 |
| 6,229,584 B1 | * | 5/2001 | Chuo et al. | .................. 349/58 |
| 6,392,873 B1 | | 5/2002 | Honda | ........................ 361/681 |
| 6,443,408 B1 | * | 9/2002 | Hung | ..................... 248/176.1 |
| 6,476,884 B1 | * | 11/2002 | Shao | ........................... 349/58 |
| 6,637,104 B1 | * | 10/2003 | Masuda et al. | .............. 29/832 |

* cited by examiner

Primary Examiner—Dean A. Reichard
Assistant Examiner—Carmelo Oliva

(57) ABSTRACT

A display assembly for use with data processing apparatus, the assembly having a display part and a support therefor, the display part being moveable relative to the support so as to allow adjustment of the display part's orientation, the display part having a connection element whereby a releasable connection may be effected to a signal or power cable, the support having a guide through which the cable may be routed away from the display part.

15 Claims, 4 Drawing Sheets

DISPLAY UNITS

BACKGROUND TO THE INVENTION AND SUMMARY OF THE PRIOR ART

This invention relates to the field of display units of the type used in conjunction with data processing apparatus such as personal computers and the like. In particular, although by no means exclusively, the invention relates to so-called "flat-panel" display units such as LCD and plasma screens that are becoming more prevalent in view of the space savings that they offer in relation to CRT (Cathode Ray Tube) monitors and as a result of the relatively low amount of power that they require, during use.

A variety of constructions of such flat-panel display units are known, many of which allow a degree of movement of the display screen to be effected, whereby a user may adjust the viewing angle in accordance with personal preferences or prevailing light conditions.

U.S. Pat. No. 6,392,873 B1 (Kabushiki Kaisha Toshiba) discloses a flat liquid-crystal display unit pivotally mounted for tilting movement about a generally horizontal axis, power and image signals being supplied to the assembly via an array of sockets disposed in a row on a rear portion of the base.

U.S. Pat. No. 5,978,211 (SamSung Electronics Co. Ltd.) discloses a similar type of flat-panel display device, in which video signal and power supply cables are plugged into rearwardly disposed connector holes, again provided on a base of the assembly, with an input unit cover being provided to conceal an interface circuit board operatively connected to the connector holes.

In both cases, the power and image signals are passed to the display screen via an internal hard-wired assembly which adds cost to the overall design and which can give rise to problems in the event of a breakage in the internal electrical links.

Other designs alleviate these drawbacks, to some extent, by allowing cables emanating from a personal computer or the like to be plugged directly into a rearwardly-disposed surface of the display screen housing, although this gives rise to an untidy and cluttered look, which is undesirable where the rear of the display assembly is visible, such as in banks, shop counters and open-plan office environments, for example.

It is an object of the present invention to provide an improved display assembly and display unit for use with database processing apparatus that overcome or at least reduce these and other drawbacks.

SUMMARY OF THE INVENTION

In accordance with a first aspect of the present invention, there is provided a display assembly for use with data processing apparatus, the assembly having a display part and a support therefor, the display part being moveable relative to the support so as to allow adjustment of the display part's orientation, the display part having a connection element whereby a releasable connection may be effected to a signal or power cable, the support having a guide through which the cable may be routed away from the display part.

The display part may be moveable angularly—conveniently rotationally—so as to allow portrait/landscape adjustment thereof, with a cable entry part of the support conveniently being disposed at or near the axis about which said angular movement can be effected.

The connection element may be disposed away from said axis.

The connection element may comprise a socket disposed so as to allow a cable plug releasably to be connected thereto in a direction generally transverse—conveniently generally perpendicular—to said axis.

The assembly may comprise a releasably-attachable cover, the cover, in use, engaging with or bearing upon the display part in a manner whereby angular movement of the display part relative thereto is permitted.

The display part may be rotatable relative to the cover.

An engagement portion of the cover may co-operate with a receiving portion of the display part.

Preferably, the engagement portion of the cover comprises a protrusion, with the receiving portion of the display preferably comprising a recess in which the protrusion is locatable.

The protrusion preferably comprises a generally peripheral rim, with the recess preferably comprising a generally circular groove.

The display part preferably is a flat-panel display.

In accordance with a second aspect of the present invention, there is provided a display assembly for use with data processing apparatus, the assembly having a display part and a support therefor, the display part being moveable angularly relative to the support so as to allow portrait/landscape adjustment thereof, a signal or power cable being routed via the support to the display part, the cable extending between the support and display part at or near the axis about which said angular movement can be effected.

Preferably, the display part has a connection element whereby a releasable connection may be effected to the signal or power cable.

The invention, in its second aspect, may comprise one or more of the features described in relation to the first aspect of the present invention.

In accordance with a third aspect of the present invention, there is provided a display unit for use with data processing apparatus, the display unit having a rearwardly-disposed connection element whereby a releasable connection may be effected to a signal or power cable, the display part being operatively associable with a support, a releasably-attachable cover being provided to cover at least part of the cable connected to the display part, the cover being attachable to the support but moveable angularly relative to the display part whereby the display part may be adjusted between portrait and landscape orientations.

Preferably, a rim of the cover is rotatably received within a groove provided in the display part.

The invention, in its third aspect, may comprise one or more of the features of the first and/or second aspects.

BRIEF DESCRIPTION OF THE DRAWINGS

Specific and non-limiting embodiments of the invention, in its various aspects, will now be described in greater detail, but strictly by way of example only, by reference to the accompanying drawings, of which.

Figure 1:
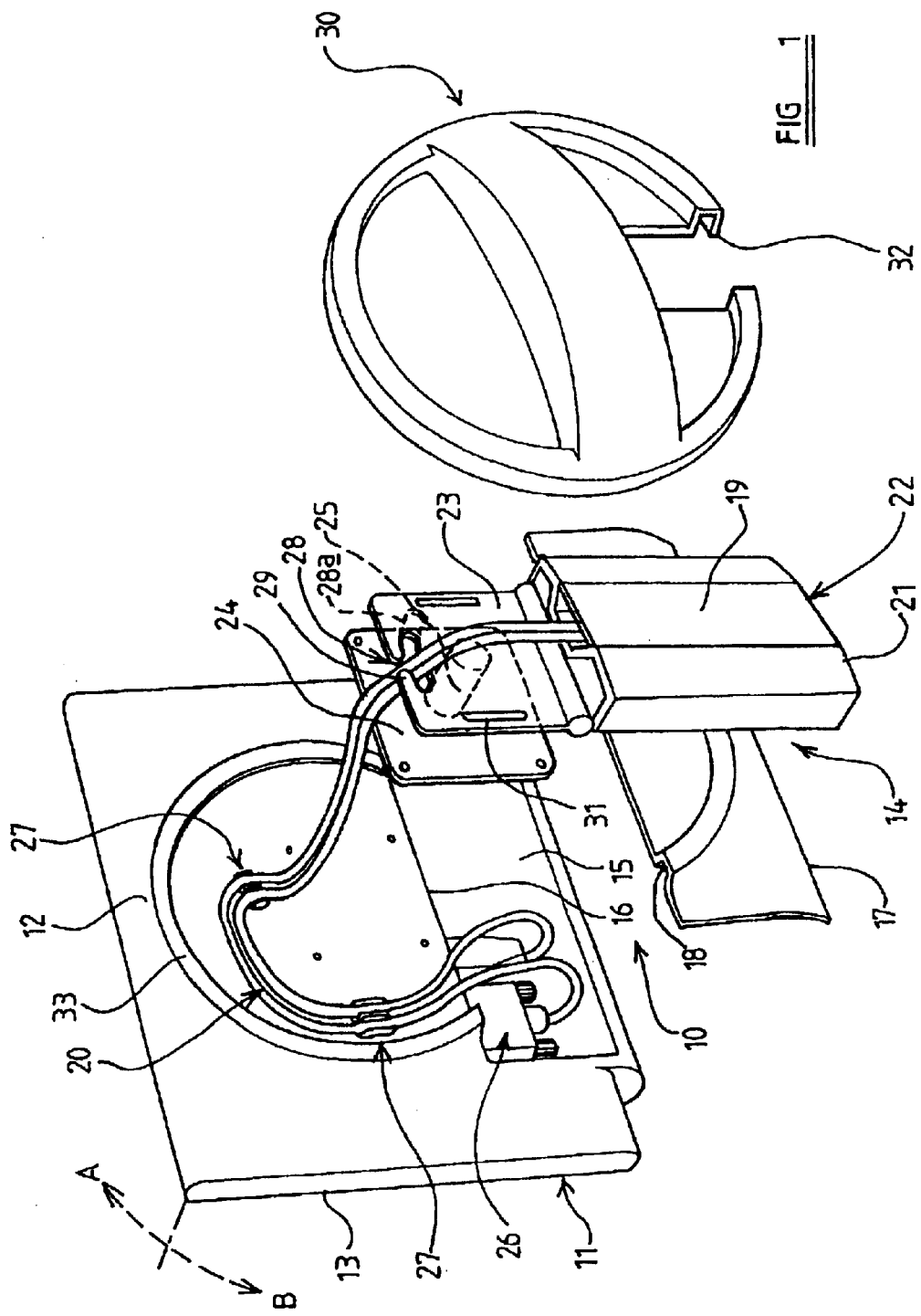
FIG. 1 is a perspective, part-exploded, view of a flat-panel display assembly.

Referring first to FIG. 1, a display assembly 10 comprises a flat-panel (e.g. LCD) display part 11 having a rearwardly disposed cover 12 and a forwardly-projecting screen surface 13, the display unit 11 being supported, in use, by a support 14 mounted to a generally conventional base construction such as a foot (not shown). It will be understood that suitable means may be provided whereby the height of the display assembly may be varied.

The display part 11 is provided, at its rear, with a connector bay 15 having, on a downwardly-extending part 16 thereof, a plurality of (in this example two) sockets by which image signals and electrical power may be supplied to the flat-panel display from a main computer unit such as a PC desktop unit. A snap-fittable cover 17 is provided, having a recessed groove 18 on an inner surface thereof, in which cables generally indicated at 19 may be accommodated, when the cover 17 is secured over the connector bay 15.

The support 14 comprises an extruded upright construction 21 having a longitudinally extending and rearwardly-facing cable guide/gutter 22 and a mounting plate 23 hinged to an upper part of the upright construction 21, so as to allow tilting of the display part 1. The display assembly also comprises an attachment plate 24 which, in use, is secured (using threaded fasteners, for example) to the rear of the display unit, with a generally horizontally extending bearing 25 being disposed between the mounting plate 23 and attachment plate 24 to enable rotation of the display unit 11 about the longitudinal axis of the bearing 25. As will be appreciated, this allows portrait/landscape adjustment of the display unit to be effected, such adjustment involving angular movement in the directions shown generally by arrows A and B in FIG. 1. The attachment plate 24 may be an industry-standard VESA (Video Electronics Standards Association) attachment plate.

It will be understood, of course, that a swivel capability may also be provided, whereby the overall assembly is rotatable about the longitudinal axis of the upright support 14, in generally conventional manner.

As shown, the image signal and power cables 20 are connected, in a releasable manner, to the downwardly facing sockets such that the plug bodies indicated generally at 26, whilst being located within the connector bay 15, lie generally flush with (i.e. generally in the plane of) the display unit 11. Other socket orientations are of course possible. The cables, which conveniently are those extending directly from a data processing apparatus such as a personal computer, are routed from the display unit to the PC (for example) via cable clips 27, with the cables then passing through a guide in the form of a constricted gate configuration 28, conveniently formed, as with the rest of the mounting plate 23, from a resilient/deformable plastics material. The limbs 29 of the gate assembly are flexible so as to allow insertion/removal of the cables, as and when appropriate, It will be appreciated that other gate configurations may be provided by which the cables are retained in position, and that suitably-configured plugs could also be used. In hand with that, an alternative slot configuration is shown in dotted outline at 28a.

As can be seen from the drawings, the cables 20 (shown partly broken, for ease of comprehension) "exit" the display unit at a position at or very close to the axis of rotation about which the portrait/landscape adjustment is effected. The advantage of such a construction is that no undue "pull" is exerted on the cables during such angular movement although it will be noted that a degree of "slack" can be allowed for, if desired, by appropriate positioning of the cables in the clips 27.

In order to conceal the cables and plugs from view, a plastics cover 30 is provided, the cover 30 being snap-fittable to the mounting plate 23 by releasable engagement of protrusions (not shown) in receiving apertures 31, for example. The cover—conveniently formed from an opaque plastics material—has a rim 32 extending almost completely around the periphery thereof, the rim 32 being locatable, in use, within a groove 33 provided in the rear cover 12 of the display unit 11. The generally circular configuration of the cover rim 32 and groove 33 allows rotation of the display unit 11 to be effected even with the cover engaged therewith and attached securely to the mounting plate 23. Thus, whilst the cables and plugs are concealed from view, the portrait/landscape adjustment facility is not impaired by engagement of the cover 30. It will also be understood that the tilting capability of the display unit 11 similarly is unimpaired, as is any swivel function that may be provided.

What will be appreciated from the foregoing is that the display assembly of the present invention exemplified above allows a display unit such as a flat-panel device to be connected to a PC, for example, using the PC's own image signal and power supply cabling. This, of course, keeps manufacturing costs associated with the display assembly to a minimum. Moreover, the orientation of the plugs 26, the routing of the cables 20, the position at which the cables "exit" the display unit and the provision of snap-fittable covers 17 and 30 allows a highly aesthetically-pleasing assembly to be produced, in that the cables and connectors are concealed from view, but which still allows for a great degree of operational versatility such as screen swivelling, tilting and portrait/landscape adjustment.

Figure 3:
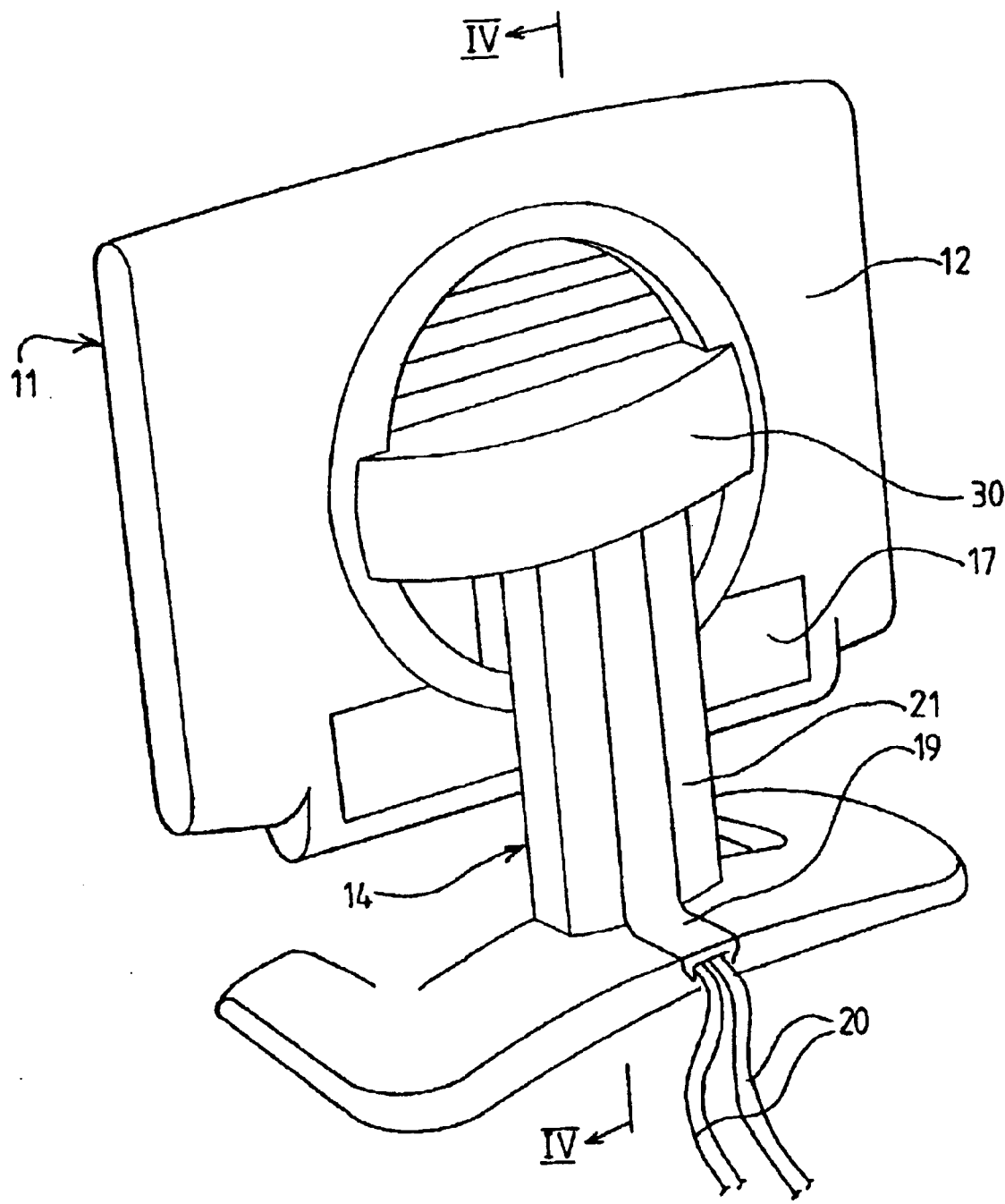
FIG. 3 is a perspective view, from the rear and above, of the components of FIG. 1, shown in an assembled condition.
Figure 4:
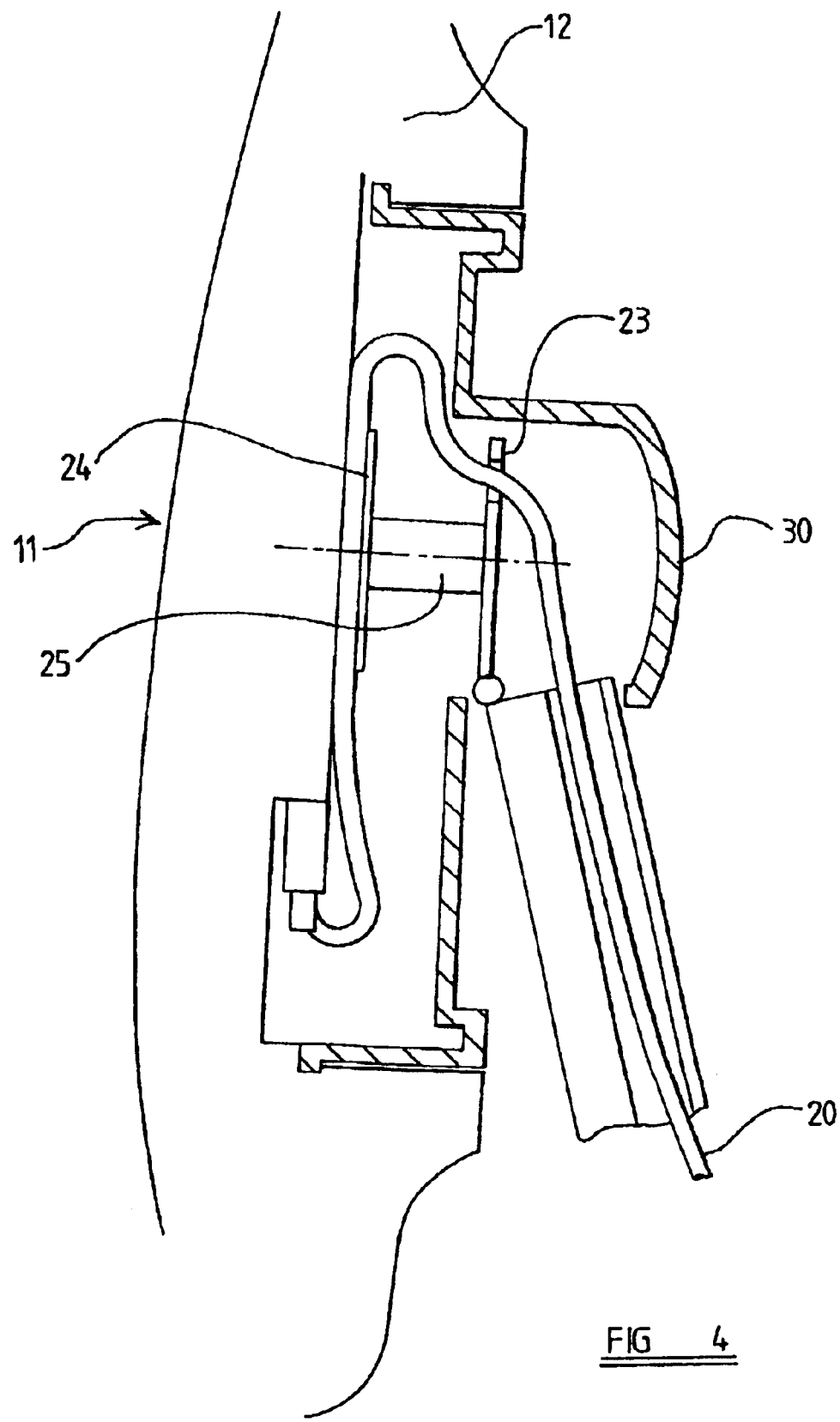
FIG. 4 is a cross-section of FIG. 3, taken along the line IV—IV.

In order to improve further the aesthetic appearance of the assembly, a plastics cable strip 19 may be used to shield from view the cable 20, by engagement with the side walls of the guide/gutter 22. A perspective view of the assembled display is shown in FIG. 3, with a cross-section thereof being illustrated in FIG. 4.

Figure 2:
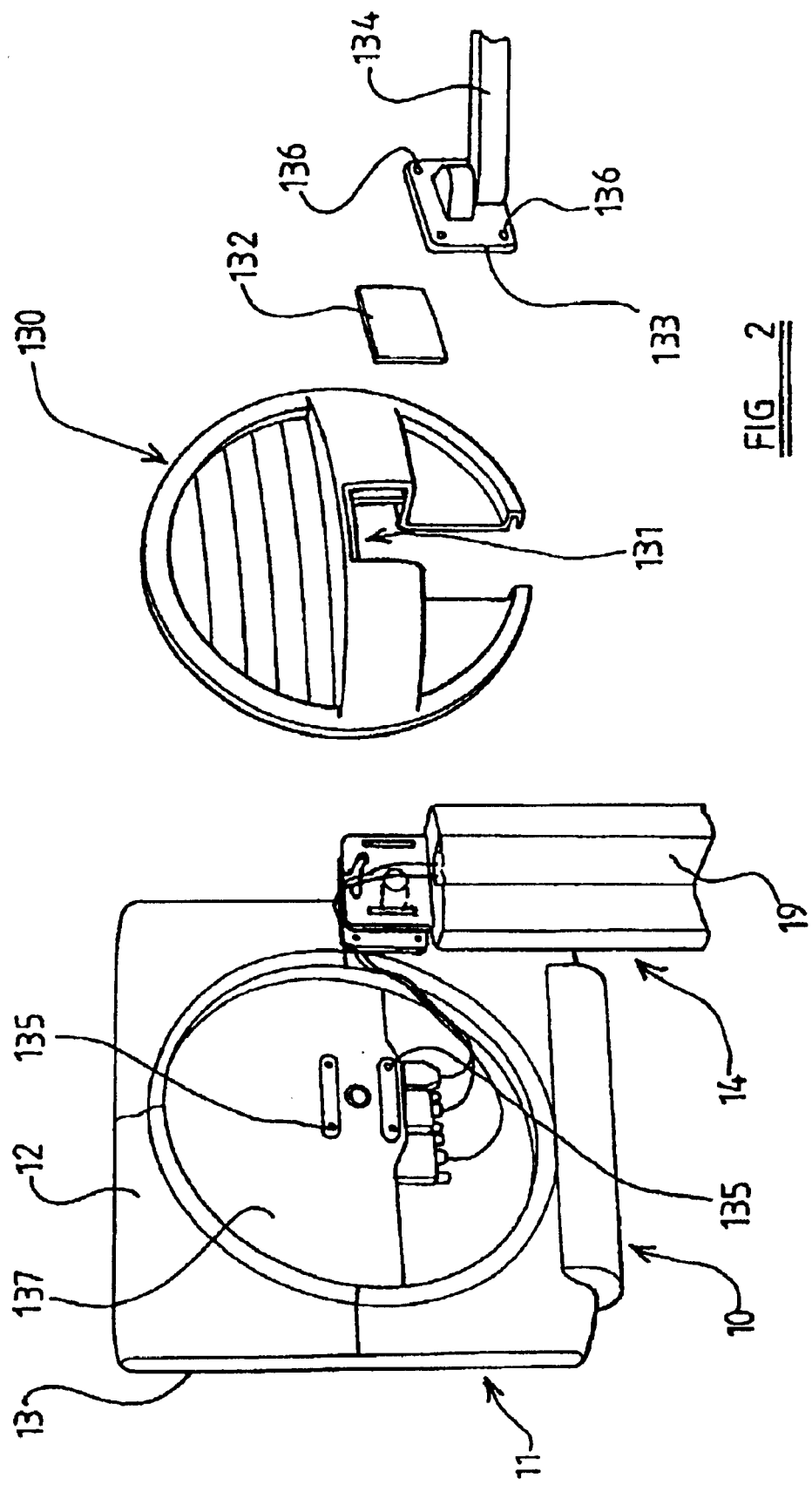
FIG. 2 is a perspective, part-exploded, view of a second embodiment of flat-panel display assembly.

FIG. 2 illustrates a slightly different embodiment of the present invention. Specifically, whilst the basic configuration is largely similar, the cables (in this case three) are plugged into the display unit at a more central position. Whilst this is not essential, it does obviate the requirement for cable clips 27. For the avoidance of doubt, however, the cable clips 27 are not in fact essential to the embodiment shown in FIG. 1, although they evidently assist in maintaining an ordered appearance. Similarly, cable clips could be used in the embodiments shown in FIG. 2, if need be.

The cover 130 is also slightly different in this case, in that an opening 131 is provided to receive a small cover plate 132.

This opening 131 allows the upright support 14 to be dispensed with, if wall-mounting is desired. Specifically, an attachment plate 133 and a wall-mounted bracket arm 134 are provided. As will be appreciated, threaded fasteners, passing through apertures 135/136 may be used to secure the attachment plate 133 directly to a rear surface 137 of the display unit 11. Conveniently, the attachment may comply with the appropriate VESA (Video Electronics Standards Association) specification, governing the positioning of the various apertures 135/136 through which the threaded fasteners pass. However, the configuration of the cover 130 is such that, if desired, it may simply be attached to an upstanding support 14, in the manner explained in more detail in relation to FIG. 1.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A display assembly for use with data processing apparatus, the assembly having a display part and a support therefor, the display part being moveable relative to the support so as to allow adjustment of the display part's orientation, the display part having a connection element whereby a releasable connection may be effected to a signal or power cable, the support having a guide through which the cable may be routed away from the display part, the display assembly further comprising a releasably-attachable cover, the cover being configured to couple with the display part in a manner to allow annular movement of the display part relative to the cover.

2. The display assembly according to claim 1 wherein the display part is moveable angularly so as to allow portrait/landscape adjustment thereof and wherein a cable entry part of the support is disposed at or near an axis about which said angular movement can be effected.

3. The display assembly according to claim 2 wherein the connection element is disposed away from said axis.

4. The display assembly according to claim 3 wherein the connection element comprises a socket disposed so as to allow a cable plug releasably to be connected thereto in a direction generally transverse to said axis.

5. The display assembly according to claim 2, wherein the cover is attachable to the support in a manner to prevent rotational movement of the cover about said axis.

6. The display assembly according to claim 5, wherein the cover is snap-fittable to a mounting plate adapted for attachment to the display part.

7. The display assembly according to claim 1 wherein the display part is rotatable relative to the cover.

8. The display assembly according to claim 1 wherein an engagement portion of the cover co-operates with a receiving portion of the display part.

9. The display assembly according to claim 8 wherein the engagement portion of the cover comprises a protrusion and wherein the receiving portion of the display part comprises a recess in which the protrusion is locatable.

10. The display assembly according to claim 9 wherein the protrusion comprises a generally peripheral rim and wherein the recess comprises a generally circular groove.

11. The display assembly according to claim 1 wherein the display part is a flat-panel display.

12. A display assembly for use with data processing apparatus, the assembly having a display part and a support therefor, the display part being moveable angularly relative to the support so as to allow portrait/landscape adjustment thereof, a signal or power cable being routed via the support to the display part, the cable extending between the support and display part at or near the axis about which said angular movement can be effected, and the display assembly further comprising a releasably-attachable cover, the cover being configured to couple with the display part in a manner to allow angular movement of the display part relative to the cover.

13. The display assembly according to claim 12 wherein the display part has a connection element whereby a releasable connection may be effected to the signal or power cable.

14. A display unit for use with data processing apparatus, the display unit having a rearwardly-disposed connection element whereby a releasable connection may be effected to a signal or power cable, the display part being operatively associable with a support, a releasably-attachable cover being provided to cover at least part of the cable connected to the display part, the cover being non-rotatably attachable to the support but moveable angularly relative to the display part whereby the display part may be adjusted between portrait and landscape orientations with the cover attached to the support.

15. The display unit according to claim 14 wherein a rim of the cover is received in a groove provided in the display part.

* * * * *